(12) United States Patent
Harrison et al.

(10) Patent No.: US 7,902,123 B2
(45) Date of Patent: Mar. 8, 2011

(54) MICROEMULSION CLEANING COMPOSITION

(75) Inventors: John Harrison, Edinburgh (GB); Mark Zwinderman, Edinburgh (GB)

(73) Assignee: Surface Active Solutions (Holdings) Limited, Stirlingshire (GB)

( * ) Notice: Subject to any disclaimer, the term of this patent is extended or adjusted under 35 U.S.C. 154(b) by 69 days.

(21) Appl. No.: 11/918,540

(22) PCT Filed: Mar. 28, 2006

(86) PCT No.: PCT/GB2006/001117
§ 371 (c)(1),
(2), (4) Date: Dec. 4, 2008

(87) PCT Pub. No.: WO2006/109016
PCT Pub. Date: Oct. 19, 2006

(65) Prior Publication Data
US 2009/0221456 A1 Sep. 3, 2009

(30) Foreign Application Priority Data

Apr. 14, 2005 (GB) .................................. 0507507.2

(51) Int. Cl.
*C09K 8/52* (2006.01)
*C11D 3/20* (2006.01)
(52) U.S. Cl. ............ 507/90; 507/267; 510/108; 510/403; 510/461; 510/505; 510/531; 510/535; 516/73; 516/902
(58) Field of Classification Search .................... 507/90, 507/267; 510/108, 403, 461, 505, 531, 535; 516/73, 902
See application file for complete search history.

(56) References Cited

U.S. PATENT DOCUMENTS

| | | | |
|---|---|---|---|
| 3,107,726 A | | 10/1963 | Greenwald |
| 3,948,325 A | * | 4/1976 | Winston et al. ............ 166/308.5 |
| 4,473,116 A | | 9/1984 | Hedges |
| 5,034,140 A | | 7/1991 | Gardner et al. |
| 5,510,037 A | * | 4/1996 | Tastayre ........................ 210/666 |
| 5,731,281 A | | 3/1998 | Mondin et al. |
| 2004/0063795 A1 | | 4/2004 | VonKrosigk et al. |

* cited by examiner

*Primary Examiner* — Timothy J. Kugel
(74) *Attorney, Agent, or Firm* — Drinker Biddle & Reath LLP

(57) ABSTRACT

A cleaning composition including which comprises a surfactant and a propionate as co-surfactant and/or co-solvent. The composition can be used, for example, to clean drilling mud containing oils.

13 Claims, 8 Drawing Sheets

MICROEMULSION CLEANING COMPOSITION

1) FIELD OF THE INVENTION

This invention relates to the formulation and application of water based microemulsions and microemulsion forming surfactant systems. More particularly the invention relates to the use of propionate compound(s) as co-surfactant(s) and/or co-solvent(s) in microemulsion and microemulsion forming systems.

2) INTRODUCTION AND BACKGROUND INFORMATION

During the drilling process for the exploration and production of oil and gas reserves the downhole conditions require a wide range of wellbore fluids for both the drilling and completion operations. The drilling process utilises complex drilling mud formulations which may be based either on water or oils (predominantly on mineral or synthetic oils). Completion operations also require the use of a range of fluids, from fresh water to highly saturated brines.

Oil-based muds are superior to water-based muds and are used particularly where drilling is difficult. For example, oil-based muds are used exclusively in North Sea oil exploration and production operations, as a consequence of the practice of directional and horizontal drilling. In other geographical locations where environmental legislation permits its use the use of diesel is often the preferred base fluid due to its preferential rheological properties and economic advantages. Particularly in the North Sea more expensive "synthetic" or "low tox(icity)" base oils or vegetable oils may be used as alternatives based, for example, on various esters, alpha olefins or plant oils.

Oil-based muds are oil continuous and consist of an oil, which may be of mineral or synthetic origin, plus detergent plus variable amounts of colloidal clay and weighting agent (e.g. bentonite). Other additives such as rheology control agents, polymers, biocides and corrosion inhibitor chemicals are also employed. During drilling mud is pumped continuously to the drill head. The oil itself lubricates and cools the drill bit, whilst the colloidal clays act as wall-building agents, acting to stabilise the wellbore. Oil and synthetic based fluids are also used to overcome borehole stability problems which may be caused by the hydration and swelling of clays in drilled shale zones when in contact with water. These demands require a fluid possessing a density sufficient to withstand hydrostatic pressures as the well is drilled deeper whilst minimizing the swelling of the drilled shale zones. Mud returning to the surface acts as a fluid transport system carrying the rock cuttings back to the surface, which vary extensively in their geologies depending on the character of the rock formation being drilled.

Water based muds are sufficient in simple drilling projects and for lower temperature wells in moderate depths. These systems require the use of wetting agents to disperse drilled solids and weighting materials. Surfactants are also often employed. These serve to improve fluid tolerance to ion contamination and to increase inhibitive properties of the fluid in drilled shales. These mud systems are also used to alter and control and/or enhance temperature stability, corrosiveness and foaming tendencies of the drilling fluid.

Muds are predominantly invert emulsion systems i.e. oil continuous systems containing a saturated internal water phase stabilised by emulsifiers and oil wetting agents which also reduce the viscosity of the mud. Due to cost, safety, and performance capabilities the oil based muds are predominantly used in preference to water based muds.

As a result of these drilling operations a "cake" of oily drilling mud and produced cuttings is left behind on all surfaces downhole and the surfaces are left in an oil wet, rather than a water wet, condition. These surfaces not only include the wellbore casing and other such equipment but also the surface of the formation itself. This situation poses a number of difficulties for completion and post completion workover operations designed for reworking a well and thence stimulating and optimising production. For example, cementing and gravel packing procedures require a water wet surface in order to allow efficient cement bonding. The removal of oily residues and solid particulate material is also required to allow the unhampered economic running of further engineering downhole e.g. screening exercises. Once the completion process is finalised the formation and screens in place must be permeable in order to allow either oil production or the processes of Enhanced Oil Recovery (EOR) by the pumping of produced water into the formation for example.

In a similar fashion tanks that have been holding oily materials and oily wastes from the above processes are required to be cleaned thoroughly before drilling mud changeovers and before the storage and circulation of brines in the completion process in order to avoid cross contamination events. In addition the oily wastes themselves may require remediation treatment.

The wellbore cleaning methods employed use a whole variety of wellbore cleanup and completion fluids to displace drilling fluids once the producing zones have been drilled and isolated in the wellbore. The result is an extremely complicated process using multiple spacers of many different types. Large volumes of organic based fluids are often required as pre-treatments and considerable amounts of waste (typically circa 1000-5000 bbls) are produced in the process. There are also often problems and complications where different spacers and fluids mix at their interfaces with the same result of producing complex mixtures of waste for treatment and/or disposal.

Once the production process itself begins various quantities of sand and water may be produced with the crude oil and this mixture requires separation prior to the crude oil being pumped through pipelines or transported to suitable refinery or storage facilities prior to processing. A range of treatment and separation processes may be applied in order to effect an efficient separation of sand, water and oil and often simple gravity separation or centrifugation methods are used.

In sand separators for example the solids settle out to the bottom of the tank. The water phase acts as a spacer/interface and the oil phase, being least dense, separates to the surface and is pumped away. Over a period of time considerable volumes of crude oil contaminated solids and sludges build up within these tanks and separators and this requires removal and treatment prior to disposal. In some cases the separation and/or storage tanks may be extremely large indeed, and offshore such tanks can make up a considerable proportion of the fabric of a rig and can be constructed of either metals or even concrete. In this instance the tanks are not cleaned on a regular basis but there is increasing pressure on the oil and gas industry for remediating these tanks prior to dismantling the structures as a major part of the decommissioning process.

Various centrifugation systems are also often used for enhanced separation and these systems often yield a crude oil contaminated solids phase as a waste bi-product also requiring treatment and disposal.

Currently and historically multipurpose industrial cleaning products are used to remove and/or clean and remediate these oily contaminants. These chemicals are often based on organic solvent solutions and blends of organic solvent products eg. Shellsol (Trade Mark) (manufactured by Shell Chemicals) and Super Pickle (Trade Mark) (manufactured by WellFlow Technologies) are often utilised. Sometimes these solvents have relatively low flash points and, for example, may comprise of (synthetic) base fluids, diesel, terpenes, xylene, benzene or toluene or mixtures thereof which simply act as an organic solvent to dissolve the organic materials and free the residues contained on the contaminated surfaces.

Often additives are included within the organic solvent to enhance their cleaning performance and to contribute other properties e.g. U.S. Pat. No. 5,333,698 is based on a non-toxic white mineral oil with additives such as wetting agents, viscosifiers, weighting agents, particulate agents etc. Other solvents may also be used. For example, U.S. Pat. No. 5,773,390 outlines the use of terpene alcohols as solvent additives in cleaning systems but these systems are not claimed as being microemulsions or microemulsion forming systems and the surfactants used are not microemulsion forming surface active agents. More commonly used as co-solvents in other examples in this field are xylene, toluene, and benzene and mixtures thereof.

Some previous patents outline the addition of salts dissolved in organic solvents e.g. U.S. Pat. No. 4,514,310 which outlines the use of N-methyl-2-pyrrolidone as a non-aqueous solvent to dissolve a density increasing salt eg. $CaBr_2$ or KSCN and to enable miscibility with water. Again other additives such as viscosity increasing polymers may be incorporated. U.S. Pat. No. 5,556,832 is similar using eg. acetates in dissolving zinc halides and alkaline earth metal halides. Also PCT Patent Specification No. WO/01/77252 discloses the use of a non-aqueous wellbore fluid with formulations of specific ionic liquids in order to enable and enhance electrical conductivity allowing electrical telemetry operations to be carried out allowing, for example, data logging procedures to be carried out remotely during the process.

However, the use of these non-aqueous fluids and the techniques described above may not render the oil contaminated surface clean enough and sufficiently water wet and additional aqueous surfactant washing procedures, pills and spacers may be required following the use of such an organic washing pill.

For these reasons aqueous systems of chemicals are utilised in such well treatment and oil removal/oily waste treatment processes. For example, British Patent Specification No. 2367315 outlines the use of polyol, polysaccharide, weighting agent, and water to form a silica free aqueous solution.

Sequestering agents such as sodium gluconate, EDTA and NTA are often incorporated into these formulations to complex with metal cations which may be present in the contaminating material and which often interfere with the efficiency of the surfactant formulations used.

U.S. Pat. No. 6,140,277 outlines the use of chelating agents N-cis-13-docosenoic-N,N-bis(2-hydroxymethyl)-N-methyl ammonium chloride, HEDP, ATMP, TTPMP, EDTA, CDTA, DPTA, and NTA, and enzyme systems eg. alpha- and beta-amylase in a viscoelastic surfactant (VES) matrix.

Alternatively, US Patent Specification No. 2001/047868 discloses the use of acids and cationic salts in aqueous systems. Such solutions may also comprise other enzymes and oxidisers. Acid treatments and combinations of oxidisers are also disclosed in U.S. Pat. No. 4,934,457. In this example both aqueous hydrogen peroxide, naphtha and hydrochloric acid are used.

Surfactants are also often used in the completion process to form isolating "pills" which are pumped between the drilling and completion fluids. The function of these surfactant formulations is to minimise the contamination of the completion fluid by the drilling mud that it will displace. Surfactants are also used in the completion fluid itself to reduce corrosion and to increase its water wetting properties in the producing zones.

More commonly used surfactant based formulations will comprise chemicals which are usually complex emulsion forming formulations of surfactants. These blends therefore tend to be a mixture of surfactants and other additives such as organic solvents which independently or together are oil or water continuous emulsion forming systems when diluted and dispersed on site in water or brines. U.S. Pat. No. 5,710,111 discloses the use of a non-aqueous (invert oil continuous) emulsion system using unhalogenated organic fluid as a wellbore fluid. U.S. Pat. No. 5,846,913 discloses another oil and water-in-oil (W/O) emulsion where the oil phase comprises a biodegradable alkane which is used as a wellbore fluid.

Polymers may also be used in emulsion systems. PCT Patent Specification No. WO/01/94742 discloses the use of a polymer emulsion for sealing and isolation applications in the wellbore and includes certain water-in-oil (W/O) microemulsion systems stabilised by polymers and cross-linking agents. The use of polymers is also outlined in U.S. Pat. No. 6,279,656 forming a water soluble "shell" with cross-linking agents. In U.S. Pat. No. 5,706,895 a polymer based system is enhanced with a foam fluid for use in workover, completion and in kill fluids. In this instance a non cross-linked polymer is used in conjunction with a surfactant. There are several disadvantages in using emulsion forming surfactant systems outlined below.

Microemulsion systems of certain types are known in the prior art. More commonly these microemulsion systems are designed specifically to have acidic properties or are combined with acids and are used for wellbore cleanup operations and in the processes of acid fracturing of formations and the treatment of subterranean formations in order to stimulate and increase productivity. In these instances it is the acidising properties which are important as one of the main modes of action in carrying out the procedures. Such disclosures are made in U.S. Pat. No. 5,008,026 outlining a water continuous system using glycol ethers as a "mutual solvent" and glycols and alcohols as co-solvent. Similarly US Patent Application Publication No. 2002/0132740 outlines the use of acid based microemulsions for a range of oil industry applications—the formulations outlined therein containing up to 60% wt acid. U.S. Pat. No. 5,034,140 outlines a similar system but this is an oil continuous acid internal system using a hydrocarbon carrier fluid for addition to an acid treatment fluid.

Because such products are highly acidic, aggressive, and highly reactive or contain other strong oxidising or reducing agents their use can entail some very deleterious risks and hazards to both personnel and equipment. These systems are, by their very nature, extremely corrosive or caustic for example and special procedures need be observed with regards to storage, transport, handling and use. Although Health & Safety should be paramount other protocols need to be considered such that screens and other such engineering equipment is not damaged through their use. In addition when such chemicals are used the potential adverse environmental effects from spillages of these formulations could also have ramifications on environmental compliance and performance. Alternatively, some chemical formulations require the use of highly toxic chemicals as part of their constituents eg. butoxy ethanol (ethylene glycol monobutyl ether). While these chemicals may not pose a significant threat to the marine or aquatic environment they certainly pose a potential health and safety threat being severely toxic and poisonous to personnel handling the chemicals.

Certain other microemulsion chemical cleaning systems have been used in the past, for example in wellbore cleanup, and other such oil and gas industry operations. The disclosures are very similar to the above and once again typically combine surfactant with alcohols, glycols and glycol ethers which are predominant as Co-surfactants and co-solvents necessary for the formulations to work.

U.S. Pat. No. 5,762,138 and European Patent Specification No. 0566394 both disclose the use of microemulsion well cleaning formulations. U.S. Pat. No. 5,762,138 incorporates an "anti-sludging" surfactant. The solvents used in this case are glycols and glycol ethers, and an alcohol is used as the co-solvent. This formulation, like those above, is primarily an acidic formulation and may therefore also be used for fracture acidising. European Patent Specification No. 0566394 is very similar but also incorporates a foaming agent additive component. British Patent Specification No. 2347682A uses a simple surfactant and alcohol as co-surfactant combination. These combinations tend to be less effective at removing synthetic base muds from surfaces. Strictly solvent based or surfactant based formulations both suffer from a lack of cleaning efficiency and both produce significant volumes of emulsion wastes which are an expensive industry problem in their own right.

Almost all of the above mentioned products are mirrored in other industries for use as cleaning agents for hard surface cleaning applications such as the inks and printing sectors.

As stated above the primary purpose of oil removal and oily solids cleaning chemicals is to remove oil, solids and associated particulate material which contaminates the surfaces in tanks and systems. As the state of the art formulations are traditionally emulsion forming systems used at low active ingredient concentrations the cleaning process is predominantly achieved by the process of immiscible displacement rather than by solubilisation and other modes of action. This in turn means that some of the surfaces may remain as oil wet surfaces if the wetting properties of the surfactant formulation are found to be lacking.

Emulsion forming surfactant systems have performance disadvantages in that they have relatively high interfacial surface tension properties when compared to microemulsion based systems. As such emulsion systems are less efficient cleaners than microemulsion forming surfactant based systems and larger volumes of washing fluid are required which carries incurred time, volume, transport and cost disadvantages with their use.

There are further substantial practical disadvantages of using emulsion forming surfactants in that the systems naturally produce emulsion type wastes. These emulsions may be stable and therefore very difficult to separate especially when quantities of fine solids are present such as colloidal clays and bentonite as is the case in waste drilling muds. Oily sludge also has a tendency to float or be suspended in water continuous systems and this can significantly interfere with engineering and the operations of recycling the cleaning fluids. Large quantities of oily water and sludge is usually therefore produced as a result of these cleaning processes. In some instances for cleaning out mud pits for example only hot water is often used. This produces an even larger volume of waste requiring treatment and disposal.

Very stringent global environmental legislation is becoming the trend in the industry and this dictates that such (hazardous) wastes must be treated prior to discharge offshore or brought back from remote regions or from offshore to land based waste treatment and disposal facilities. Economic treatment is not always achievable and many operators are beginning to implement zero discharge policies. As such, large volumes of this type of waste require transport to shore and treatment and disposal by waste management companies in this fashion at considerable cost to operators. The extensive logistics required to perform this operation are also expensive and carry considerable associated health and safety risks, especially when the lifting and transportation of skips is required. This latter operation is also severely hampered by adverse weather conditions.

Many of the microemulsion products currently available on the market are temperature sensitive. Wellbore cleanup and other downhole remediating operations in particular are typically carried out at high temperatures downhole of circa 70-150° C. Most microemulsion systems are inherently temperature sensitive and indeed it has been well known for many years by those skilled in the art that phase behaviour can be altered, and phase separation of microemulsion systems can be readily achieved, by simply altering the temperature. This phase separation significantly reduces the effectiveness of the surfactant system employed.

The applicants have found that, if the operational temperature rises to above the cloud points of (microemulsion) surfactant systems, they phase separate and often do not achieve comparable levels of cleaning efficiency as those systems which are not temperature sensitive and which do not phase separate. In the latter case the surfactants remain active in aqueous solution maintaining their chemical cleaning, surface activity, surface tension reduction and detergency capabilities.

In summary a significant problem encountered by the systems of the prior art has been the large volumes of surfactant solution required in order to achieve efficient cleaning. In order to improve efficiency co-surfactants have been employed which in many instances are environmentally unfriendly. The amounts of co-surfactant employed have generally been small compared with the amount of surfactant utilised. However, the large amounts of surfactants employed results in expensive systems. Moreover, the systems of the prior art in general are not suitable for use and/or perform poorly in brine conditions and over large temperature ranges.

3) SUMMARY OF THE INVENTION

According to the invention there is provided a microemulsion cleaning composition comprising a surfactant and a propionate as co-surfactant and/or co-solvent. The surfactant can be in the form of a blend of surfactants. The term propionate encompasses compounds which are salts or esters of the propionate (or propanoate) ion $C_2H_5 COO^-$. It also covers compounds which are salts or esters of the hydroxylated forms of the $C_2H_5 COO^-$ ion such as 2-hydroxypropionate.

Suitably, the propionate is selected from the group comprising alkyl propionate, n-propyl propionate, n-butyl propionate, n-pentyl propionate, ethyl-3-ethoxy propionate, ethyl-(S)-2-hydroxy propionate, isopropyl-S-(–)-2-hydroxy propionate, propyl-S-(–)-2-hydroxy propionate, butyl-(S)-2-hydroxy propionate, styralyl propionate (methyl phenyl carbonyl propionate), benzyl propionate or mixtures thereof.

Optionally, the microemulsion cleaning composition comprises an organic solvent or blend thereof.

Optionally, the microemulsion cleaning composition comprises an additional co-surfactant(s) or co-solvent(s) or a blend thereof.

Suitably, the microemulsion cleaning composition comprises water or brine.

Advantageously, the microemulsion cleaning composition comprises a chemical builder or a mixture thereof. The chemical builder or a mixture thereof enhances oil and water microemulsions and can be of any chemical identity and set at any desired concentration.

Suitably, the microemulsion cleaning composition comprises a sequestering or complexing agent or mixtures thereof.

Suitably, the microemulsion cleaning composition comprises a floculating or coagulating agent or mixtures thereof.

Preferably, the microemulsion cleaning composition comprises a corrosion inhibitor or a mixture of corrosion inhibitors.

Advantageously, the microemulsion cleaning composition comprises a weighting agent or a mixture thereof.

Advantageously, the microemulsion cleaning composition comprises a viscosifier and/or a gelling agent or mixtures thereof.

In a preferred embodiment of the invention, the propionate(s) comprises from 2 to 12 carbon atoms, preferably, from 4 to 12 carbon atoms. Suitably, the propionate comprises an alkyl propionate—a propyl, isopropyl, butyl, isobutyl, hexyl, isohexyl, ethyl-3-ethoxy propionate, ethyl-(S)-2-hydroxy propionate, isopropyl-S-(−)-2-hydroxy propionate, propyl-S-(−)-2-hydroxy propionate, butyl-(s)-2-hydroxy propionate or mixtures thereof. More preferably, the propionate comprises pentyl propionate. These kind of products are manufactured under the trade names UCAR® propionates by Dow and its subsidiaries among others.

However aromatic propionates such as styralyl propionate or benzyl propionate can also advantageously be used.

The invention also extends to a microemulsion forming system comprising a microemulsion cleaning composition as hereinbefore defined.

The invention also extends to the use of a propionate or a blend of propionates as co-surfactant and/or co-solvent in the preparation of a microemulsion cleaning composition.

In a further embodiment, the invention also extends to a method for cleaning comprising treating an item, material or surface to be cleaned with a microemulsion or a microemulsion forming cleaning composition as hereinbefore defined.

Suitably, the material or surface to be cleaned comprises petroleum based contaminated materials or any filter cake. Suitably, solids and liquid fractions are separated following cleaning.

The microemulsions/microemulsion forming systems of the invention comprise a surfactant or surfactant blend, propionate(s) and water/brine and optionally additional co-surfactant, co-solvent and/or solvent. The formulations do not make use of alcohol, glycol and glycol ether components in the systems as co-surfactant, co-solvent or mutual solvent.

The invention finds application in, inter alia, industrial hard surface cleaning applications especially the inks and printing industries and the oil and gas industry.

In particular, within the latter sector the formulations have relevance in the cleaning of crude oil solids, sludges and sands from sand separators and tanks and in the enhanced removal of crude oil from contaminated surfaces e.g. for decommissioning and Enhanced Oil Recovery (EOR) techniques.

The formulations of the invention also have relevance in open and cased downhole applications such as well treatment fluids for the removal of mud residues in wellbore/downhole cleanup, filter cake removal and near wellbore damage treatment and in well stimulation operations as part of the drilling, completion and workover processes and for the remediation of surface systems e.g. the cleaning of mud pit tanks, waste drill mud cuttings, fine mud solids, containers or the washing down of engineering equipment and contaminated surfaces and as degreasing operations.

The formulations of the invention also have applications in the destabilisation of emulsion systems and act as emulsion breakers with the capability of splitting emulsion wastes into distinct oil, water, and clean solids phases. In addition the formulations can be used to enhance the slurrification of oily materials for re-injection or for facilitated transport operations.

The invention allows for multiple pass treatments utilising the technology and can also allow for a single pass aqueous treatment (requiring no additional acid or caustic based systems or organic based pre- or post-treatment systems). There are very considerable cost and time savings as a result of employing the formulations and methods disclosed by the invention whilst also minimising the volumes of waste produced from the cleaning operations. Significant environmental advantages are also apparent.

When cleaning with such surfactant formulations the products may be formulated to be temperature insensitive and as such the technology may operate at both low and elevated temperatures at the point of operation without inducing changes in physico-chemical behaviour and/or phase separation. The formulations can be used cold without having to heat the systems but at the same time are able to operate efficiently at high temperatures with even better performance. This leads to the production of robust products for use under field conditions.

Because the system may not require pre-treatments this allows the chemical technology and the cleaning operation to operate efficiently from a time and cost perspective rendering a cleaned surface free and devoid of oil and oil-contaminated residues in a single pass. This ensures that the surfaces are left water wet. Mud pits and fluid holding and separation tanks may also be cleaned effectively using such products avoiding cross contamination events.

The formulations of the invention may also be employed as part of a multiple spacer (multiple pass treatment) process in conjunction with other fluids. An aquatic or organic pre- and/or post-treatment may be carried out if required as appropriate to increase cleaning capability still further. Uniquely the chemical treatment surfactant products may be used more effectively at increased active ingredient concentrations in order to produce less waste from the cleaning process. For example typically the surfactant pill may range from only 50-100 barrels in volume when used for some wellbore cleanup and displacement applications.

The invention provides advanced (cleaning) formulations and a more cost and time efficient method for carrying out these kinds of operation in the field. The formulations and system of the invention also improve on product performance and overcome many of the problems and the chemistries of the prior art, including environmental performance.

The invention finds particular application in methods for the cleanup and recovery of crude oil and crude oil contaminated materials and surfaces in the cleaning of sand separators, in Enhanced Oil Recovery techniques and in decommissioning. Additionally the invention may be applied to the removal and cleaning of base oils, drilling fluid, drill cuttings and drilling mud in downhole cleanup operations and in the remediation of surface systems including the cleaning of drilling mud pits, engineering systems and surfaces used in industrial operations using the formulations outlined herein. The microemulsions technology of the invention may be applied to these operations as a single pass process or one that does not require the use of an organic based pre-treatment chemical system.

The formulations of the invention also improve on the cleaning capability and efficiency of the surfactant technology and formulations currently used in such industrial processes without necessarily requiring the use of potentially dangerous and hazardous chemicals.

The formulations of the invention also improve the efficiency of applications in the destabilisation of emulsion systems and act as emulsion breakers with the capability of splitting emulsion wastes into distinct oil, water, and clean solids phases. In addition the formulations can be used to enhance the slurrification of oily materials for re-injection or for facilitated transport operations.

The formulations of the invention can also be adapted to be temperature insensitive microemulsion cleaning formulations.

In summary this invention relates to the design and methods for using surfactant formulations and more specifically to water based microemulsions and microemulsion forming surfactant systems essentially comprising a surfactant or surfactant blend, propionate(s) and water or brine and optionally solvent and/or additional co-surfactant. Uniquely the formulations do not make use of alcohol, glycol and glycol ether components in the systems as co-surfactant, co-solvent or mutual solvent.

An oil-in-water (O/W) microemulsion is defined as a thermodynamically stable, single-phase mixture of oil, water and surfactant, such that the continuous phase is water (which may contain dissolved salts) and the dispersed phase consists of a monodispersion of oil droplets, each coated with a close-packed monolayer of surfactant molecules—each micro structure is referred to as a micelle. The inherent thermodynamic stability of these systems arises from the fact that, due to the presence of the surfactant monolayer, there is no direct oil-water contact. Oil-in-water microemulsions are often optically transparent since the micelles formed are so small that they do not scatter light.

The capability for the surfactant systems to form microemulsions is an important feature of the present invention. Fundamental distinctions exist between microemulsions and ordinary emulsions. Emulsions and microemulsions are similar only in the superficial sense that they can be described as mixtures of oil, water and an amphipathic substance, usually called a surface active agent (soap, surfactant, emulsifier, dispersant, detergent etc).

Microemulsions by definition are thermodynamically stable. That is to say, for a particular composition (type and amount of each component), and within particular environmental constraints, the microemulsion system is preferred over a system of separate phases of oil, water and surfactant. The corollary of this argument is that microemulsions form spontaneously when their constituents are mixed together. Once formed, microemulsions remain so (characterised macroscopically as transparent single phases), unless some property is changed. For example, increasing or decreasing the temperature beyond certain limits, may lead to phase separation in some systems.

Emulsions, by contrast, are not thermodynamically stable. Emulsions form only by input of mechanical energy (e.g. by shaking, sonication or shearing), and the emulsion system can only be maintained by continuous input of energy; when the energy input is withdrawn the emulsion phase separates over a period of time, yielding distinct organic and aqueous phases (the surfactant may be distributed between the two phases, or sometimes exists as a third phase). There are no "windows" of environmental conditions in which such systems form microemulsions.

Although the applicants do not wish to be bound by any theorem, it is believed that microemulsion systems may exist because the surfactants form a close-packed monolayer at the oil-water interface, which effectively excludes direct oil-water contact. Surfactants may not therefore stabilise microemulsions if they cannot saturate an oil-water interface. Typically, emulsion forming surfactants only partially coat the interface, leaving uncoated areas exposed to bulk continuous phase solvent.

For example, water-continuous emulsions usually consist of oil droplets only partially covered with surfactant; the uncoated surfaces are therefore directly exposed to the continuous aqueous phase. This is thermodynamically unfavourable; the oil droplets aggregate by coalescing at their exposed surfaces, increasing the surface area:volume ratio and hence minimising oil:water contact. The outcome of extensive droplet coalescence is therefore bulk-phase separation. In microemulsions there are no uncoated surfaces and thus there is no driving force for coalescence and phase-separation. The microemulsion system is the more energetically favourable position for that chemical system under those environmental conditions.

The rate of phase separation of an emulsion can actually be relatively slow; emulsions can be created which only completely phase separate after several weeks or even months. Nevertheless the fundamental distinction between emulsion and microemulsion systems remains. Indeed, the interesting properties of microemulsions, both in general and in the context of the specific applications described here, arises from the thermodynamic properties arising from total oil: water exclusion arising from interfacial close-packing of the surfactant molecules.

Apparent from gross physical differences, which can be determined by visual examination (microemulsions show no tendency to phase separate and are usually optically transparent, whereas emulsions are opalescent or turbid and inevitably phase-separate), the two can be distinguished by measuring the surface tension at the oil-water interface. The surface tension at plain oil-water interfaces is typically of the order of 50 mNm$^{-1}$. Emulsions formed by mixing oil water and "ordinary" (i.e. non-microemulsion-forming) surfactants are typically characterised by interfacial surface tensions of the order of 20-50 mNm$^{-1}$, whereas microemulsions are characterised by far lower surface tensions typically below 20 mNm$^{-1}$ and can be of the order of $10^{-3}$ to $10^{-6}$ mNm$^{-1}$, these latter values reflecting the absence of direct oil-water contact.

It is partly these properties described above which are attributable to rendering microemulsion systems much more efficient in their cleaning, mobilising and emulsion destabilisation capabilities when compared to normal emulsion forming surfactant systems and this has been demonstrated in PCT Patent Application No. PCT/GB00/00841.

Indeed even the modes of operation of microemulsions can be argued as being essentially different from emulsion systems. Whereas emulsion forming surfactants often only operate to displace oil or to partially disperse oil in water microemulsion forming surfactants, on the other hand, may not only displace and disperse oil acting as a detergent but may also disperse the oil acting as an emulsifier to the extent of completely dissolving or solubilising the oil or water into the continuous solvent medium.

The present invention therefore exploits microemulsion systems. The invention exploits a number of features whereby as an aqueous solution of an O/W microemulsion-forming surfactant system can absorb oil from a bulk oil phase forming an O/W microemulsion, so can the same solution absorb oil from an oil-coated solid surface or (fine) solid particulates with the same result. Furthermore, in the oil-in-water (O/W) microemulsion environment, any oil is effectively encapsulated within the surfactant monolayer, and is therefore no longer in direct contact with the original surface or solid. Oil contaminated surfaces are thus rendered completely water wet as a result of the microemulsification process. In effect it can be envisaged that the contaminating oil is simply dissolved and solubilised within the aqueous solvent via a process of microemulsification as described above.

In addition if microemulsion systems are used in a cleaning operation the modes of action of both microemulsion forming surfactant and an organic solvent may be combined to further increase cleaning capability. In this fashion the applicants have demonstrated that the synergies of this combination of modes of action may even outperform pure organic solvents or pure surfactant systems when used independently in their cleaning capabilities for many industrial cleaning applications.

The mode of action of the systems outlined herein may therefore be three fold. First, the penetration of the contaminating oil layer through the solvent microemulsion mechanism, secondly the action of microemulsification of the oil components into the aqueous phase, and finally by water wetting of the underlying solid surfaces through the surfactant/detergent action.

Another advantage of these systems is that microemulsions also increase in their cleaning efficiency when the Active Ingredient (AI) concentrations are increased unlike emulsion systems that often demonstrate no increase in cleaning efficiency on increasing concentrations above their Critical Micellar Concentration (CMC). In turn lower volumes of higher AI concentrations may be used in microemulsion based cleaning formulations in comparison to emulsion based systems. This capability has significant ramifications on waste minimisation, improved time requirements, cost reductions and on associated health and safety aspects.

One specific advantage of using microemulsion systems is that commercially available flocculating and coagulating agents can be successfully incorporated and utilised within the formulations as required in order to augment the operating system. This does not result in the breakdown in the stability of the microemulsion system.

This has been demonstrated with many microemulsion systems using a range of flocculating agents at recommended concentrations of up to 25 mlL$^{-1}$ flocculent without interfering with the surfactant phase behaviour. Examples of both cationic (eg. Alcomer 230L, Alcomer 630, Magnafloc 1697, Magnafloc 1597) and anionic (Alcomer 110, Magnafloc 919, Alcomer 120, Magnafloc E10, Magnafloc E24) flocculating agents have been used manufactured and supplied by Ciba Speciality-Chemicals.

The same results cannot be achieved when using normal (O/W) emulsion forming surfactant systems due to the fact that there is still significant direct oil-water contact at the interface.

Furthermore, the use of such chemicals would not be expected to confer any specific benefit in solvent based systems since flocculating agents are inactive in oil-based media.

Builders, sequestering agents, corrosion inhibitors and other performance enhancing chemicals, which may be either water or oil soluble, may also be included to optimise and enhance the performance of the microemulsion systems applied. Again these chemical agents can be used without interfering with the stability of the microemulsion systems used.

Builders have been successfully used in the past with emulsion forming surfactants. These builders are traditionally and more preferably phosphate based. Builders serve to improve levels of detergency, combat water hardness and partly act as completing agents in the surfactant systems. Typical examples in decreasing order of efficiency are sodium hexametaphosphate, tetra-potassium pyrophosphate (TKPP), and sodium tripolyphosphate (STPP).

The amount of phosphate that may be utilised in such formulations is governed by international environmental legislation due to known adverse effects of phosphates on ecosystems. Builders can be used effectively with microemulsion systems in order to improve performance but one advantage of the microemulsion systems outlined herein is that, due to their enhanced cleaning performance and their increased salt insensitivity, these systems may not even require the incorporation of builders to increase their detergency and thus phosphates may be eliminated from the formulations entirely. Less effective phosphate free builders are also available but accordingly these also may not be necessary in such a formulation eg. sodium metasilicate or sodium carbonate.

As outlined above these characteristics mean that the cleaning action of O/W microemulsion forming systems and O/W microemulsion systems is different from conventional surfactant formulations. At higher active matter concentrations the major mode of cleaning action is by miscible displacement instead of immiscible displacement. This technique renders the cleaned surfaces water wet. At lower active matter concentrations as aqueous rinsing is employed immiscible displacement is also used in the cleaning action. These O/W microemulsion formulations therefore again offer the advantage of a combination of cleaning modes of action supplying a multifaceted approach to the cleaning applications addressed using the technology described herein.

Organic solvents are also not necessarily required in the systems outlined in this invention rendering the formulations more environmentally sound and less hazardous to transport and use which may have significant advantages from an environmental and a health and safety point of view. The simple mode of action of microemulsification in situ may be sufficient in many of these applications. This factor can be viewed as a very positive advantage especially when the technology is employed in offshore environments or in environmentally sensitive areas.

However, it is a further advantage with the microemulsion systems described herein that more suitable and more effective organic solvent additives may be incorporated in the formulations to further increase their cleaning efficiency.

Biodegradable natural plant extracts and new synthetic alternatives may also be suitably employed within the formulations to increase the cleaning performance while maintaining environmental and health and safety compliance in the field. A great deal of work has recently been carried out by many chemical producing companies to produce and promote the use of "green" environmentally sound and environmentally sustainable organic solvents. For example natural plant extracts may be used as is the case with citrus terpenes etc. Also oxygenated solvents are preferred eg. BP oxygenated solvents marketed under the trade name HyKleen and the Uniqema solvent brand marketed under the trade name Ariva-Sol to name but a few examples. These products may be non-toxic, can be up to and over 85% readily biodegradable and have flash points up to 99° C. and above.

Anionic surfactants suitable for use in forming the microemulsions and microemulsion forming systems in accordance with the present invention may be selected from the group comprising fatty acid soaps, alpha olefin sulphonates, sulphonates, amine ethoxylates, amine salts of linear alkyl benzene sulphonic acid, aromatic sulphonates comprising alkyl cumene, xylene, benzene and toluene sulphates or sulphonates, earth metal salts of olefin sulphonate and alcohol and alcohol ethoxylate sulphates and sulphonates, sulphosuccinates and sulphosuccimates and blends of such anionic surfactants. The use of anionic surfactants is not limited to these.

Nonionic surfactants suitable for use in forming the microemulsions and microemulsion forming systems in accordance with the present invention may be selected from the group comprising ethoxylated and propoxylated surfactants consisting of condensation products of ethylene oxide with aliphatic alcohols and of alkyl amines in either straight or branched chain configuration, sugar based surfactants, alkyl polyglucosides, alkyl glucosides, and blends of such nonionic surfactants. The use of non-ionic surfactants is not limited to these.

Cationic surfactants suitable for use in forming the microemulsions and microemulsion forming systems in accordance with the present invention may be selected from the group comprising quaternaries, halogenated amines, complex amides, amido amines and blends of such cationic surfactants. The use of cationic surfactants is not restricted to these.

Zwitterionic surfactants suitable for use in forming the microemulsions and microemulsion forming systems in accordance with the present invention may be selected from the group comprising betaine surfactants eg. alkyl dimethyl betaines or cocoamidopropyl betaines and blends of such zwitterionic surfactants. The use of zwitterionic surfactants is not restricted to these.

Organic solvents suitable for use in forming the microemulsions and microemulsion forming systems in accordance with the present invention may be selected from the group comprising aromatic hydrocarbons, limonene, d-limonene, citrus terpenes, terpenes, terpinol, pinenes, xylene, toluene, benzene, alkyl benzenes, and propionates e.g. n-propyl, n-butyl, and n-pentyl propionate, pentanes, paracymene, n-alkyl pyrrolidones, dimethyl piperidone, propylene carbonate, ethers, di-butyl ether, butyl butyrate, amyl acetates, acetate, oleates, stearates, heptanoate, laurates, caprylates, adipates, butyrates, iso-butyrates, esters, di-basic esters, phenyl esters (eg. Arivasol) di-ethers, olefins, alpha olefins, (isoparrafins, ketones, acyclic amides, cyclic amides, lactones, ketones, sulphoxides, cyclic carbonates, oxygenated solvents, and mixtures thereof. The use of organic solvents is not restricted to these.

Generally, the propionate derivatives typically comprise a functional group—propionate group—an aryl or alkyl group (which may be branched or linear in nature) with a range C1-C12, more preferably C1-C10 and most preferably C2-C6 and optionally an ethoxy or hydroxy group. The products typically have good health and safety advantages. All products are more than 60% biodegradable and as such are classified as being readily biodegradable. The products are also non-toxic providing significant environmental benefits. Most of the products are only slightly miscible/soluble with water and as such have heretofore been recommended for use within organic solvent cleaning systems only.

Propionates suitable for use as co-surfactants/co-solvents include, but are not limited to, alkyl propionate, n-propyl propionate, n-butyl propionate, n-pentyl propionate, ethyl-3-ethoxy propionate, ethyl-(S)-2-hydroxy propionate, isopropyl-S-(−)-2-hydroxy propionate, propyl-S-(−)-2-hydroxy propionate, butyl-(s)-2-hydroxy propionate, styralyl propionate, benzyl propionate or mixtures thereof.

As disclosed above the primary mode of action of traditional aqueous emulsion forming surfactant systems is by dispersion and immiscible displacement. However, with the types of microemulsion system disclosed herein the mode of immiscible displacement is combined and/or replaced with miscible displacement and solubilisation and (if solvent is present) solvent microemulsion action. One of the methods of the invention therefore exploits the ability of these dynamic O/W microemulsion systems (microemulsion forming preparations of surfactants and additives) to spontaneously absorb oil from surfaces and materials and to encapsulate this oil by forming o/W microemulsions in situ.

As described previously the method of solubilisation of oil and thus of cleaning of the oil contaminated surfaces can be controlled simply by placing an upper limit on the microemulsion Active Ingredient (AI) content. If using a microemulsion as a cleaning agent the concentration of Active Ingredient in the formulation may be adjusted to determine the level of cleaning efficiency desired.

The surfactant cleaning treatments described herein can also be applied and further enhanced by using an O/W microemulsion itself to carry out the cleaning process rather than just an aqueous surfactant system capable of solubilising the oil to be removed into a microemulsion. In this case the invention exploits the capabilities of microemulsion cleaning systems to combine an aqueous surfactant and a solvent washing system as one in a continuous water based medium. This multiple mode of cleaning action has been clearly demonstrated by the applicants to greatly improve the cleaning capabilities and performance of products used with the appropriate choice of solvent.

A dramatic decrease in surface tension also takes place when using microemulsion systems—far more so than when employing traditional emulsion forming surfactants.

The products and formulations described herein are typically applied in the same way as is the case with traditional cleaning formulations whether they be organic or aqueous in nature, including but not limited to their use in augmenting automated engineering, pressure jetting, scrubbing, spraying and circulatory systems.

The formulations disclosed herein may be applied as a single pass treatment method requiring no organic based pre-treatment. Alternatively they may be applied as part of a multiple stage cleaning process. Thus any cleaned surfaces which may contain residual O/W microemulsion can be extracted by aqueous or organic solvent-rinsing. Organic rinsing (for example using acetone) may be applicable to industrial applications where water residues are required to be absent following the water based wash. When rinsing with an aqueous composition the deep penetration of the Winsor IV realm into the water-corner of the phase diagrams is of significance since the O/W microemulsion can be diluted out simply by rinsing with water or brine without resulting in loss of stability in the system. Thus in every case this dilution does not lead to phase separation of the residual O/W microemulsion.

The applicants have demonstrated that the (temperature insensitive) microemulsion systems described herein outperform the use of systems comprising co-solvents such as glycol and glycol ether combinations e.g. ethylene glycol, diethylene glycol, and polyethylene glycol or terpene alcohols e.g. pine oil and terpineol.

Due to the efficiency of these aqueous cleaning formulations, the cleaning method employed may render the use of an initial organic based solvent wash un-necessary in the wellbore cleanup and completion process. This has obvious time, cost saving, and waste minimisation advantages in the whole process when applied in the field.

If a solvent washing process is required as a pre-treatment then this process may also be enhanced by incorporating temperature stable microemulsions technology. A temperature stable water-in-oil (W/O) microemulsion system should be used which will not only greatly improve the washing process but will also result in the use of less solvent. This may reduce operating costs and minimise waste production as well as reduce both health and safety and also environmental risks. Of course these microemulsion systems may also be recycled and/or split in a similar and conventional fashion to other microemulsion systems by way of a controlled change in a suitable environmental or chemical variable.

It is advantageous for the industrial cleaning applications referred to above to use O/W microemulsion and O/W microemulsion forming systems of the invention as the cleaning agent. Many microemulsion systems of these types cannot be blended as 100% Active Ingredient (AI) liquid concentrates i.e. containing no water—especially if either the surfactant product is a solid or if one of the other chemical constituents is a solid. More significant to these applications described herein near to 100% AI concentrate microemulsions can be supplied for dilution and use in the field using these products and chemical components.

Problems are often encountered when diluting microemulsion systems of the prior art in the field. As the concentrate is diluted with water or brine impractical regions are often encountered in the phase diagram such as gel regions, liquid crystals, mesomorphous phases and multiple phase windows etc—the simple act of dilution may therefore result in phase separation of the microemulsion system. However, products of the invention as exemplified below can be used at any concentration as desired.

Many surfactant systems are sensitive to the addition of salt if sea water is used as the diluent in the dilution process in offshore environments. These systems are therefore not suitable and practical for use in the field as they are not robust and dynamic enough in their physico-chemical characteristics to remain as stable fluid single phase Winsor IV microemulsions under the field conditions stipulated. Compositions of the invention, however, are salt tolerant to reasonable degrees and may not form these impractical phases during the dilution process. Because the systems described herein are also often less susceptible to temperature fluctuations they offer another advantage such that they are more robust and are more practically applied in the field.

Further practical advantages of microemulsion formulations are that emulsion wastes are not produced as a result of the cleaning process. This has ramifications on cost, operational efficiency and practicality. Solid fines settle out well from O/W microemulsion systems due to the efficiency of the cleaning capabilities of microemulsions and due to the fact that all the oil has been solubilised into the aqueous phase, even from the fine particulate material, which is so often the cause of practical problems.

Because the solids settle out from the wash solution under gravity or by the use of enhanced methods such as centrifugation the wash solution way be recycled and reused for further washing treatments. This avoids the recycling of solids through the washing system which in turn increases cleaning efficiency and reduces the risk of potential engineering blockage, damage, and downtime.

4) DESCRIPTION OF THE ASSOCIATED FIGURES, EG. DRAWINGS, GRAPHS AND TABLES

Various embodiments of the invention will now be described, by way of example only, having regard to the accompanying examples and drawings in which.

5) DETAILED DESCRIPTION OF THE INVENTION

Figure 1:
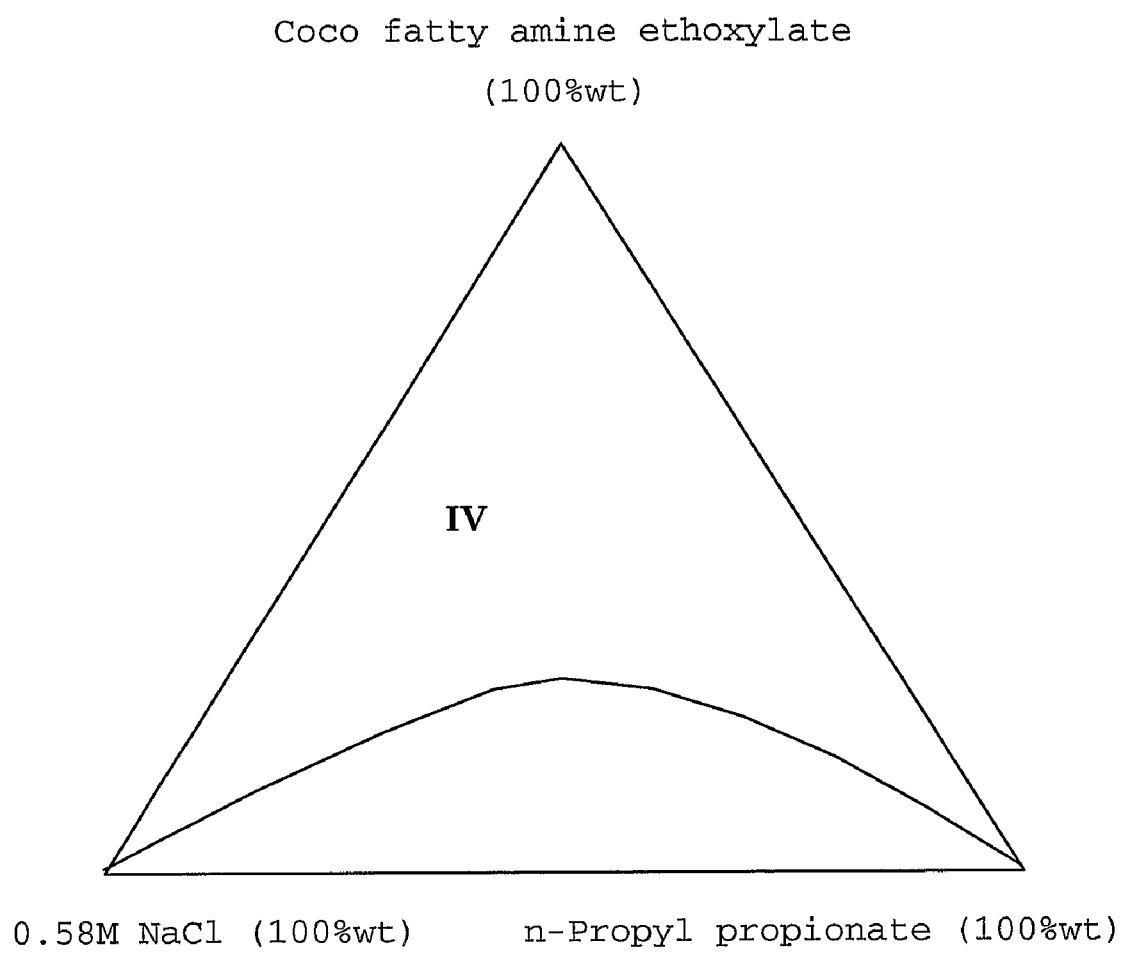
FIG. 1 is a ternary phase diagram (Coco fatty amine ethoxylate, 0.58M NaCl and n-Propyl propionate) at 25° C.
Figure 2:
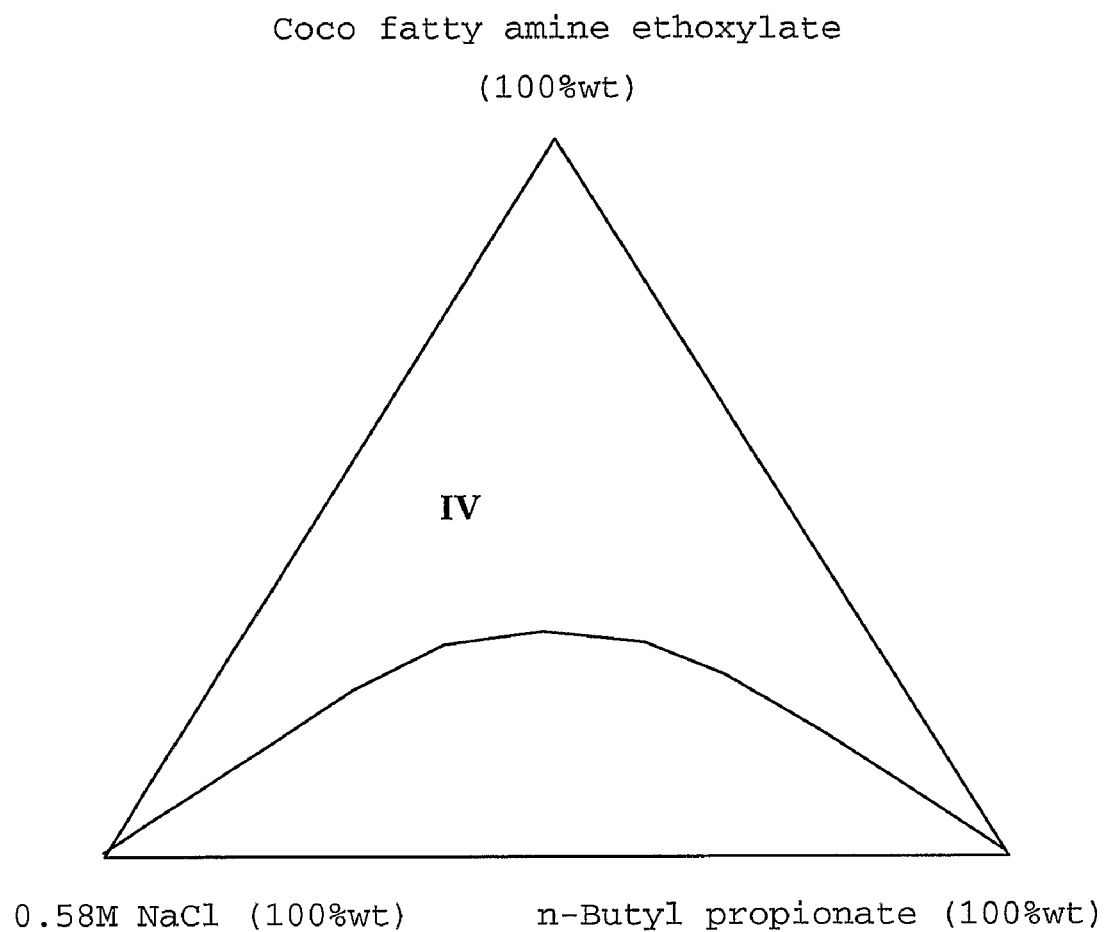
FIG. 2 is a ternary phase diagram (Coco fatty amine ethoxylate, 0.58M NaCl and n-Butyl propionate) at 25° C.
Figure 3:
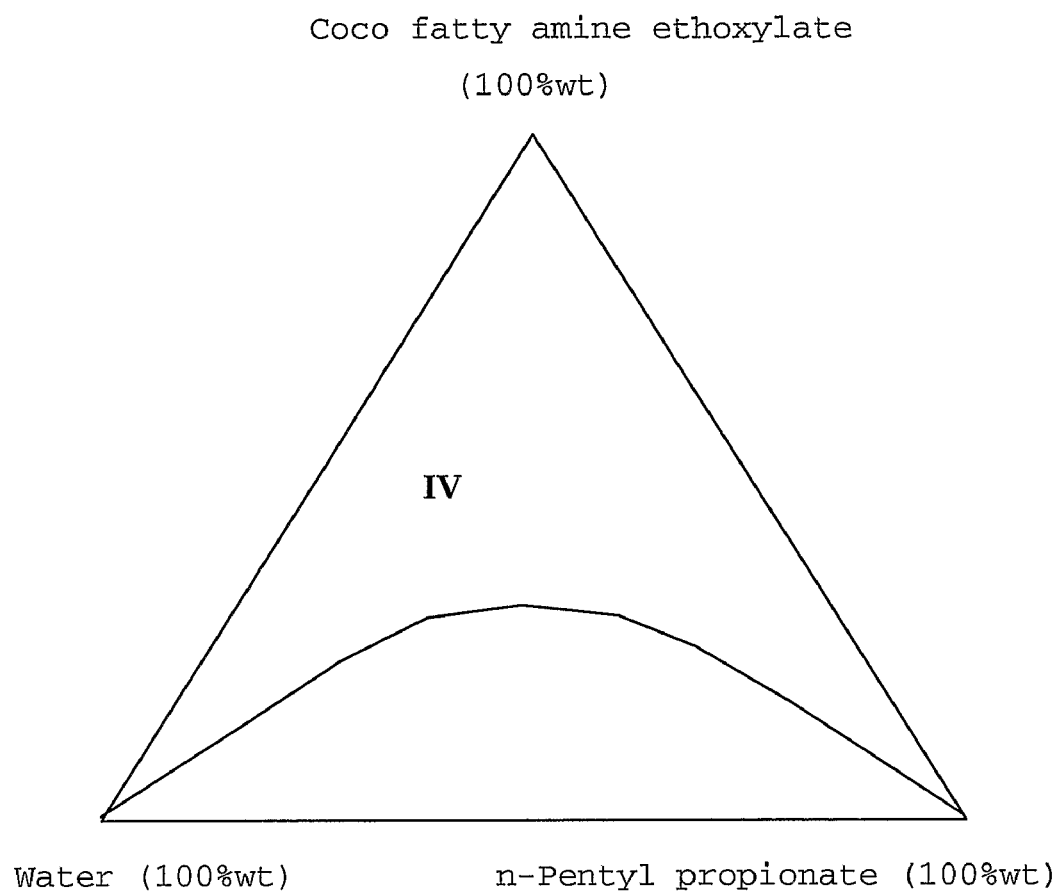
FIG. 3 is a ternary phase diagram (Coco fatty amine ethoxylate, water and n-Pentyl propionate) at 25° C.

As shown in the drawings, surfactant behaviour can be quantified in terms of triangular phase diagrams. For example the ternary phase diagram for the system Coco fatty amine ethoxylate, water and n-Pentyl propionate is shown in FIG. 3.

The apexes of the phase diagram each correspond to one of the components in pure form—oil, water, or surfactant at the stated ratio. Any point on one of the axes corresponds to a mixture of two of those components in a defined ratio (given in percent weight; % wt). Any point within the phase diagram corresponds to a mixture of the three components in a defined ratio.

The physical state of the mixture at equilibrium can be mapped on to the phase diagram. The phase diagrams in FIGS. 3 and 4 for example are characterised by a prominent single phase O/W microemulsion region, known as a Winsor IV system, which extends from the surfactant/water axis towards the surfactant/oil axis. Outside of the Winsor IV region is an area which corresponds to equilibrium multiphase regions commonly known as Winsor I, II, or III regions. Alternatively the region was a gel, liquid crystal or a multiphase system.

Many previously known types of microemulsion could be described as being "static" oil holding microemulsions. This is to say that, through blending the components of the system with the correct combination of chemical constituents in the right order, a stable single phase O/W microemulsion system may be formed. However, these static types of microemulsions using such combinations of ingredients will not form a single-phase microemulsion if they are combined in slightly different proportions or in a different order. Once a single-phase microemulsion has been formed in these static systems any significant change in environmental variable or any variation in the amounts of any one of the chemical components to the system will result in phase separation and multi phase Systems. As a result static microemulsion systems are extremely susceptible to slight environmental and chemical changes and they therefore may have very limited use in industrial applications such as those described here.

The majority of the microemulsion systems described herein are very different in their capabilities. These microemulsion systems are "dynamic" in nature. The result is extremely large Winsor IV regions or "windows" especially at low AI concentrations. This factor is extremely important for the practical and cost efficient application of these systems in the field which, in the past, has been a hindrance to their commercialisation.

In dynamic systems microemulsions can be formed by mixing the constituents together in any order and in any number of different proportions within this window of opportunity in the phase diagram providing a virtually endless number of formulation options and AI concentrations within given environmental parameters. Once again this has significant practical benefits in the field with regards to ease and time of product manufacture and the products themselves are very robust. As a result dynamic systems can be applied as an aqueous surfactant system which is then capable of solubilising oil into the system by microemulsification forming an O/W microemulsion during the cleaning process. Alternatively the products may be applied as an O/W microemulsion cleaning formulation with organic solvent already present therein.

The following examples are presented to demonstrate both the optimisation of O/W microemulsion formulations for use in the field and the increase in cleaning efficiency achieved. In the following examples, waste muds were treated using the standard Fann 35 (spinning bob) procedure outlined below developed as a standard international wellbore cleanup laboratory test.

It should be noted that all levels and chemical components outlined in the following examples are intended to be illustrative only. As described above anyone skilled in the art of this area of technology will recognise that both the levels and specifics of the formulations of each component applicable in the formulations can be readily varied to suit the needs of any given implementation.

Examples of the Optimisation of Surface Active Constituents in Microemulsion (Forming) Surfactant Solution Formulations for Use in the Field.

In the past it has been documented that the combination of certain surfactants or the use of single impure surfactants can exhibit reduced temperature instability of microemulsion systems to certain extents. Typically these systems can be stable for a temperature range of circa 5° C. to 75° C. This has been achieved by combining the opposite temperature dependence of nonionic and anionic surfactants e.g. alcohol ethoxylate surfactants and Aerosol-OT (AOT). This technique is still used in industry today.

The more commonly used ethoxylated nonionic surfactants are well known to become more hydrophobic and less hydrophilic with increasing temperature. In other words the preferred monolayer curvature becomes more negative and the systems tend to form W/O microemulsion systems. The reverse happens when reducing the temperature for these nonionic systems. It is thought that this response is due to the increasing dehydration of the ethoxylated groups on increasing the temperature. With ionic surfactants it has been shown that the opposite effect can be true i.e. by increasing the temperature the preferred monolayer curvature becomes more positive and the systems tendency is to form O/W microemulsion systems. It has been postulated by researchers in the past that this may be due to increased counterion dissociation at increased temperatures.

Using this knowledge it is possible to formulate microemulsion products to enhance their temperature stability. Alternatively it has been well documented that microemulsion surfactant systems can be readily split and recycled by exploiting their phase behaviours and by passing the system through its Phase Inversion Temperature (PIT). The PIT is the temperature which corresponds to the phase inversion from, for example, an O/W to a W/O microemulsion. For example when using anionic surfactants an O/W microemulsion may be formed at a set temperature, but on lowering the temperature, the system may phase separate to release the oil component contained therein.

The inventors have been able to demonstrate that the addition of a range of performance enhancing chemicals may be incorporated into microemulsion (forming) surfactant systems in order to optimise cleaning capability, chemical performance and cleaning efficiency at both low and elevated temperatures. These chemical additives can be added to the microemulsion systems without compromising their stability or environmental profile. Indeed only relatively small concentrations of added chemical may be required in order to greatly improve the overall performance of the technology. In addition these chemical additives may be readily available at industrial scales, are well tested and understood, may be environmentally sound and may also be cost effective.

Phase Diagram Examples.

The phase diagrams in FIGS. 1 to 8 are given by way of example to show the variety of surfactants that can be used in conjunction with propionate(s) to form effective microemulsion and microemulsion forming systems.

Figure 4:
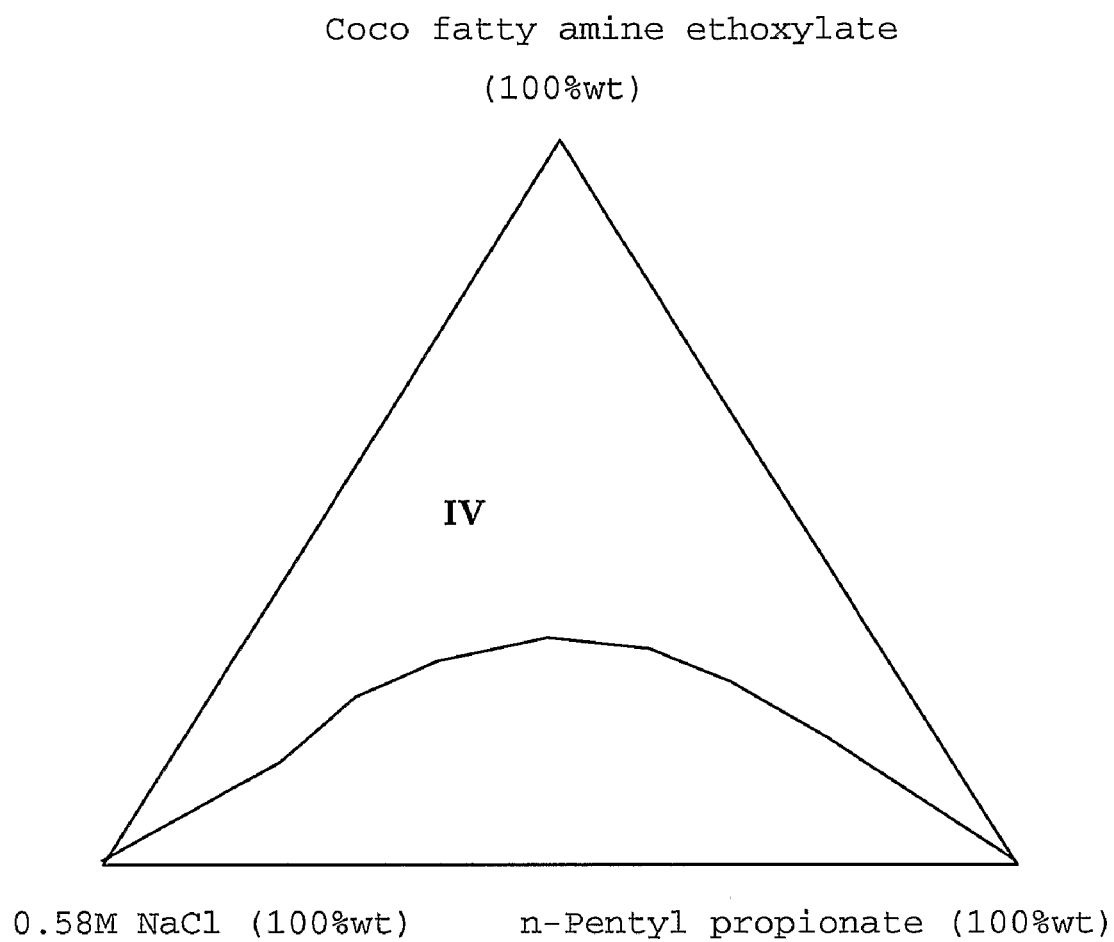
FIG. 4 is a ternary phase diagram (Coco fatty amine ethoxylate, 0.58M NaCl and n-Pentyl propionate) at 25° C.
Figure 5:
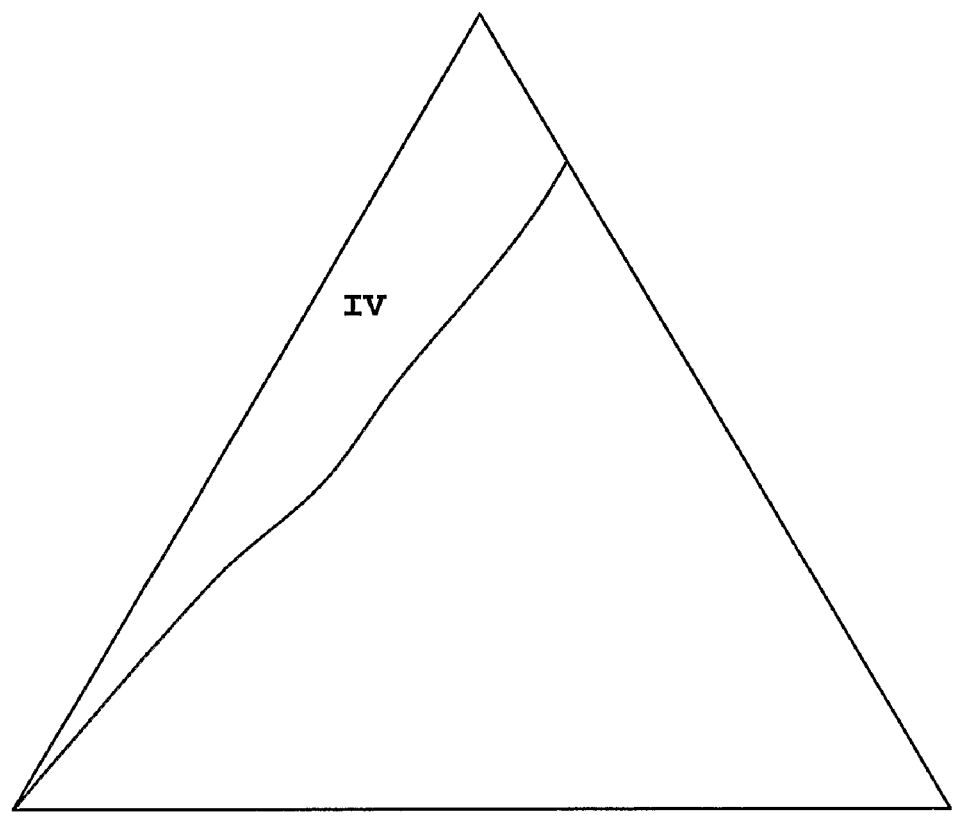
FIG. 5 is a ternary phase diagram (Alkyl polyglucoside 0.58M NaCl and n-Propyl propionate) at 25° C.
Figure 6:
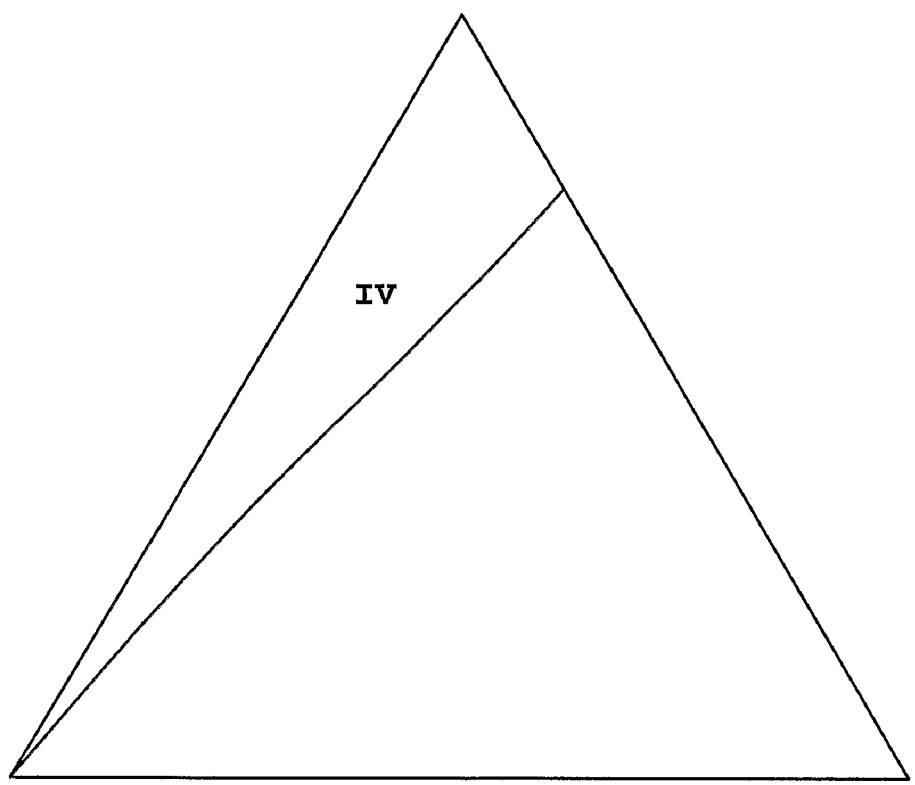
FIG. 6 is a ternary phase diagram (Alkyl polyglucoside 0.58M NaCl and n-Butyl propionate) at 25° C.
Figure 7:
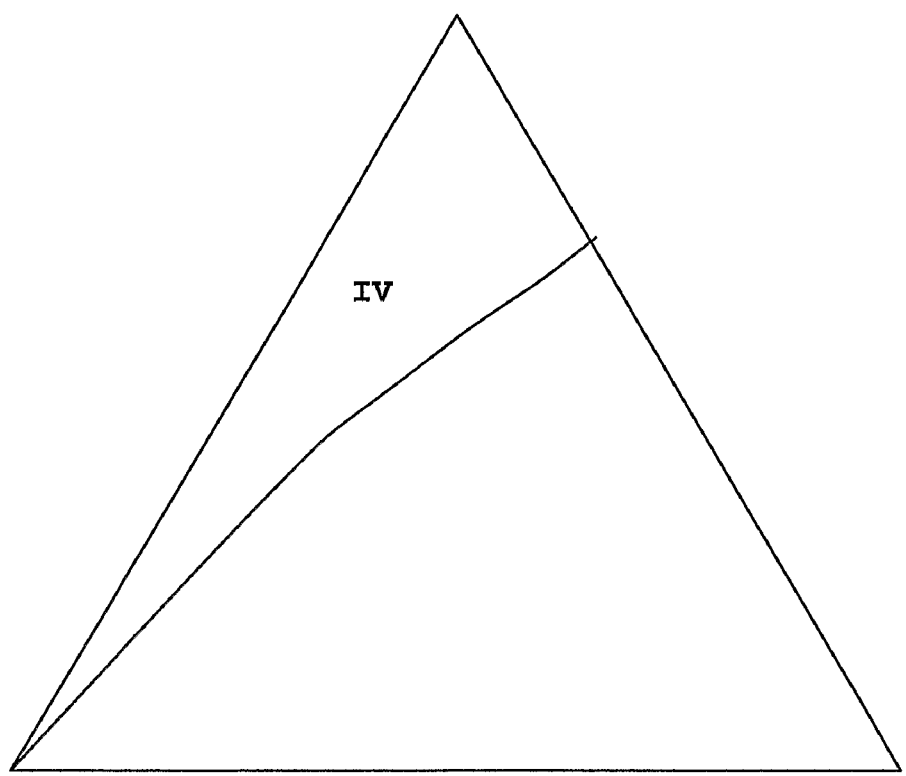
FIG. 7 is a ternary phase diagram (Alkyl polyglucoside 0.58M NaCl and n-Pentyl propionate) at 25° C.
Figure 8:
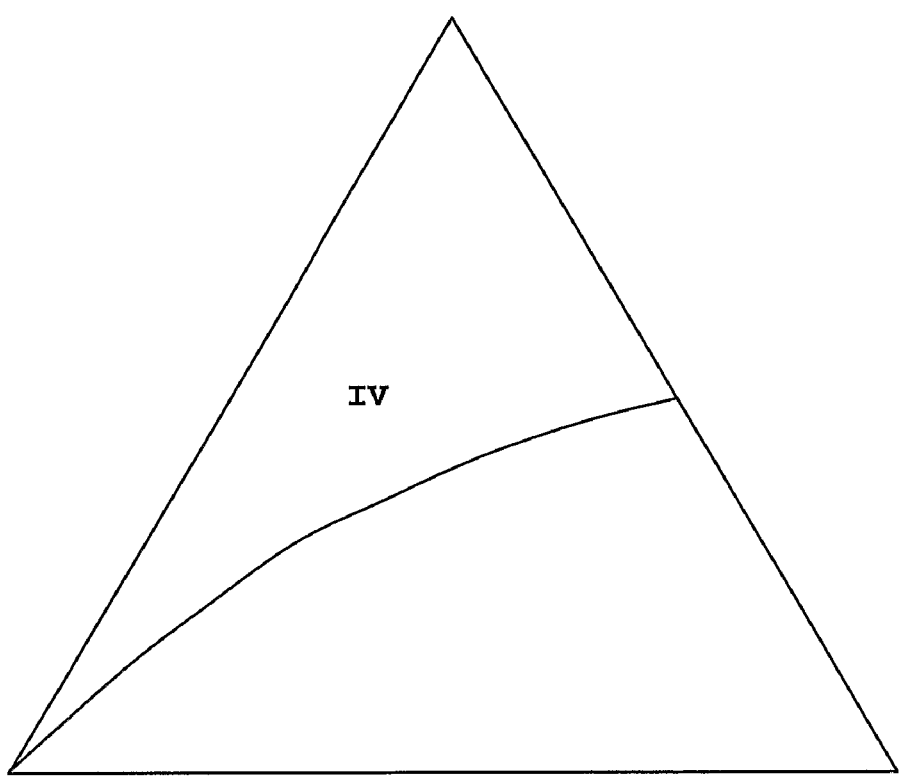
FIG. 8 is a pseudoternary phase diagram (Sodium alkyl ether sulphate:butyl-(S)-2-hydroxy propionate at 1:1 ratio by weight, 0.58M NaCl and n-Pentyl propionate) at 25° C.

Extremely large Winsor IV regions were apparent e.g. FIGS. 3 and 4 indicating the huge degree of variation that can exist in any formulation indicating the great degree of flexibility that the products of the invention give to formulating microemulsion and microemulsion forming systems using propionate components. Traditionally Winsor IV areas are considerably smaller within the phase diagram. The examples also demonstrate that both freshwater and brine based microemulsion systems can be formed e.g. FIGS. 1 and 4.

Crude Oil Cleaning Examples.

In the following examples, oil contaminated sands were treated using the following procedure:
1. A fixed weight of solids was slurried with the same fixed weight of a brine/water+microemulsion mixture at 1-5% wt active ingredient.
2. The microemulsion, excess oil and solids phases were separated by centrifugation.
3. The residual O/W microemulsion in the solids was removed by rinsing with brine, followed by centrifugation to separate the solids and the liquids phases.

Two different types of heavily oiled sand were used in the cleaning evaluations. Firstly a North Sea crude oil contaminated sand comprising circa 6% water, 20% oil, and 74% solids and secondly a weathered heavy fuel oil contaminated sand comprising circa 5% water, 4% oil, and 91% solids resulting from an oil spill at sea being washed up onto the shoreline.

Two cycles of treatment were used to remediate these sand samples (one wash with oil-in-water microemulsion consisting of sodium alkyl ether sulphate:butyl-(S)-2-hydroxy propionate at 1:1 ratio by weight and n-Pentyl propionate in brine and one brine rinse). Data are given in Table 1. The final oil content of the recovered solids for the North Sea crude oil sand was 0.25% wt oil on dry solids. The final oil content of the recovered solids for the weathered heavy fuel oil sand was 0.52% wt oil on dry solids.

Extraction Procedure:

Solids oil assay: Following treatment 100 g (+/−5 g) of recovered solids were weighed into retort chambers and the samples were retorted to 500° C. for minutes as outlined in the international retort standard procedure API Recommended Practice RP13B—Standard Procedure for Field Testing Oil-Based Drilling Fluids (Guidelines for sampling, analysis and calculation of oil on cuttings). Results were expressed as grams of oil per kilogram of dry retorted solids and were then calculated as % oil content by weight dry solids.

The change in the oil content of the solids following each step of the process is summarised in Table 1. The results prove that a variety of crude oil and weathered heavy oil contaminated sands may be remediated by use of this technology to residual oil contents of less than 1% wt to meet EU environmental legislation limits for the discharge of such solids offshore. The weathered heavy fuel oil was more difficult to remove than North Sea crude but the level of cleaning performance was such that the sand was still cleaned to below the 1% wt oil legislative limit.

TABLE 1

Summary of data for crude oil contaminated sand samples at each treatment step.

| Cleaning Steps | Mean Oil Content (% wt oil on dry solids) Sample 1 | Mean Oil Content (% wt oil on dry solids) Sample 2 |
| --- | --- | --- |
| Original oil Content | 20.00 | 3.70 |
| surfactant wash | 1.01 | 2.20 |
| water rinse | 0.25 | 0.52 |

Examples 1 to 8 Below Give Suitable Formulations in Accordance with the Invention.

TABLE 2

Product Examples

| Example | Component Details | Composition (% wt) |
| --- | --- | --- |
| 1 | Cocoa fatty amine ethoxylate | 6.00 |
| | Propyl propionate | 4.00 |
| | 0.58M NaCl | 90.00 |
| 2 | Cocoa fatty amine ethoxylate | 7.00 |
| | Butyl propionate | 3.00 |
| | 0.58M NaCl | 90.00 |
| 3 | Cocoa fatty amine ethoxylate | 6.00 |
| | Pentyl propionate | 4.00 |
| | 0.58M NaCl | 90.00 |
| 4 | Cocoa fatty amine ethoxylate | 7.00 |
| | Pentyl propionate | 3.00 |
| | Water | 90.00 |
| 5 | Alkyl polyglucoside | 8.50 |
| | Propyl propionate | 1.50 |
| | 0.58M NaCl | 90.00 |
| 6 | Alkyl polyglucoside | 9.00 |
| | Butyl propionate | 1.00 |
| | 0.58M NaCl | 90.00 |
| 7 | Alkyl polyglucoside | 8.50 |
| | Pentyl propionate | 1.50 |
| | 0.58M NaCl | 90.00 |
| 8 | sodium alkyl ether sulphate | 4.00 |
| | butyl-(S)-2-hydroxy propionate | 4.00 |
| | Pentyl propionate | 2.00 |
| | 0.58M NaCl | 90.00 |

It will be appreciated by the person skilled in the art that the concentration of surfactant and propionate may be varied as desired up to 100% active ingredient.

The invention is not limited to the embodiments herein described which may be varied in construction and detail.

The invention claimed is:

1. A microemulsion cleaning composition comprising a surfactant and a propionate as co-surfactant and/or co-solvent wherein the propionate is selected from the group consisting of n-propyl propionate, n-butyl propionate, n-pentyl propionate, ethyl-3-ethoxy propionate, ethyl-(S)-2-hydroxy propionate, isopropyl-S-(−)-2-hydroxy propionate, propyl-S-(−)-2-hydroxy propionate, butyl-(s)-2-hydroxy propionate and mixtures thereof.

2. A microemulsion cleaning composition as claimed in claim 1 wherein the microemulsion cleaning composition comprises an organic solvent or blend of organic solvents.

3. A microemulsion cleaning composition as claimed in claim 1 wherein the microemulsion cleaning composition comprises additional co-surfactant(s) or co-solvent(s) or a blend thereof.

4. A microemulsion cleaning composition as claimed in claim 1 wherein the microemulsion cleaning composition comprises water or brine.

5. A microemulsion cleaning composition as claimed in claim 1 wherein the microemulsion cleaning composition comprises a chemical builder or mixtures thereof.

6. A microemulsion cleaning composition as claimed in claim 1 wherein the microemulsion cleaning composition comprises a sequestering or complexing agent or mixtures thereof.

7. A microemulsion cleaning composition as claimed in claim 1 wherein the microemulsion cleaning composition comprises a flocculating or coagulating agent or mixtures thereof.

8. A microemulsion cleaning composition as claimed in claim 1 wherein the microemulsion cleaning composition comprises a corrosion inhibitor or a mixture of corrosion inhibitors.

9. A microemulsion cleaning composition as claimed in claim 1 wherein the microemulsion cleaning composition comprises a weighting agent or a mixture thereof.

10. A microemulsion cleaning composition as claimed in claim 1 wherein the microemulsion cleaning composition comprises a viscosifier and/or a gelling agent or mixtures thereof.

11. A microemulsion cleaning composition as claimed in claim 1 wherein the propionate(s) comprises from 4 to 12 carbon atoms.

12. A microemulsion forming system comprising a microemulsion cleaning composition as claimed in claim 1.

13. A method for cleaning comprising treating an item, material, or surface to be cleaned with a microemulsion or a microemulsion forming cleaning composition as claimed in claim 1.

* * * * *